3,007,927
TRIAZINE DERIVATIVES
David Liberman, Paris, France, assignor to Hoffmann-La Roche Inc., Nutley, N.J., a corporation of New Jersey
No Drawing. Filed Aug. 9, 1960, Ser. No. 48,369
Claims priority, application France Aug. 14, 1959
6 Claims. (Cl. 260—249.9)

This invention relates to triazine derivatives. More particularly the invention relates to dihydrazones of asymmetric triazines. The compounds of this invention are represented by the following structural formula:

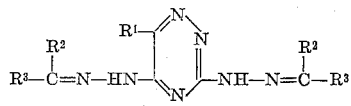

In the above formula the symbol $R^1$ represents hydrogen or a lower alkyl group such as methyl, ethyl, propyl, isopropyl, butyl, isobutyl, or the like, of which methyl and ethyl are preferred. The symbol $R^2$ represents hydrogen, lower alkyl or phenyl and the symbol $R^3$ represents carboxy lower alkyl or carboxyl.

The above described compounds are produced from 3,5-dihydrazino-1,2,4-triazine, or 3,5-dihydrazino-6-lower alkyl-1,2,4-triazine and an aldehydo- or keto acid such as formylacetic acid, β-formyl-propionic acid, β-benzoyl-propionic acid, pyruvic acid, acetoacetic acid, levulinic acid and the like. For convenience, the compounds of this invention are named as diacid dihydrazones of the 3,5-dhydrazino-1,2,4-triazine in accordance with the acid used in their preparation, for example, dipyruvic acid dihydrazone of 3,5-dihydrazino-1,2,4-triazine, dilevulinic acid dihydrazone of 3,5-dihydrazino-1,2,4-triazine and di-levulinic acid dihydrazone of 3,5-dihydrazino-6-ethyl-1,-2,4-triazine, which constitute a preferred group. The systemic nomenclature for these compounds which is long and cumbersome to use is provided for convenience in the examples.

The dihydrazones are produced by condensing 3,5-dihydrazino-1,2,4-triazine or a 3,5-dihydrazino-6-lower alkyl-1,2,4-triazine with the appropriate aldehydo- or keto acid utilizing about two proportions of the oxo compound for each proportion of dihydrazinotriazine. The reactants are heated, preferably at reflux, in an anhydrous organic diluent. Several volumes of diluent for each volume of the combined reactants are used. Ethanol is preferred as the diluent since many of the dihydrazones are insoluble or only slightly soluble in the cold in this medium which makes separation of the product easy.

The starting materials may be produced as illustrated in the examples which follow as well as in copending application Serial No. 31,274, filed May 24, 1960.

The dihydrazones, being divalent carboxylic acids, are readily soluble in alkalis, such as alkali metal hydroxides, alkali metal carbonates and bicarbonates, e.g. sodium bicarbonate solution. The dihydrazones may be isolated as mono- or di-salts from aqueous basic solutions by evaporating off the solvent.

The products of this invention exert a strong vasodilatory effect and are useful as hypotensive agents. Part of them also possess a psychotonic activity. The dihydrazones may be administered orally or parenterally in conventional dosage forms such as tablets, capsules, injectables and the like.

The following examples are illustrative of the invention. Temperatures are stated on the centigrade scale.

*Example 1*

165 g. of ethyl tartrate were dissolved in 1600 ml. of acetic acid and then 550 g. of lead tetraacetate were added at 15–20°. The mixture was stirred for 7 hours at room temperature. It was then cooled and 150 ml. of concentrated sulfuric acid were added below 10°, then filtered. To the filtrate was added a solution of 80 g. of thiosemicarbazide in 800 ml. of water and left to stand for 12 hours in the cold. There were obtained 100–106 g. of ethyl glyoxylate thiosemicarbazone with a melting point of 177–178°. By concentrating the mother liquor an additional quantity of the reaction product was obtained.

87.5 g. (0.5 mol.) of ethyl glyoxylate thiosemicarbazone were dissolved in 1 liter of 1 N sodium hydroxide and heated at reflux for one hour on a water bath at 90°. After cooling, it was acidified with concentrated hydrochloric acid. The 5-hydroxy-3-mercapto-1,2,4-triazine melted at 260–262°.

To 30 g. of 5-hydroxy-3-mercapto-1,2,4-triazine in 1100 ml. of dry pyridine were added 31 g. of phosphorus pentasulfide. The mixture was heated at reflux on a boiling water bath for 1½ hours with stirring. The solution became dark-colored during the course of the reaction. It was then cooled, the pyridine was decanted off and this was distilled in vacuo until abundant crystallization occurred. To the residue were added 500 ml. of hot water whereupon some hydrogen sulfide was evolved. It was then permitted to stand overnight in the cold. 3,5-dimercapto-1,2,4-triazine melted at 230°.

To a solution of 40 g. of 3,5-dimercapto-1,2,4-triazine in 300 ml. of absolute alcohol were added slowly, with stirring 75 ml. of 98% hydrazine hydrate. The mixture was heated on the water bath and every two hours an additional 60 ml. of hydrazine hydrate were added. After a total of 315 ml. of hydrazine hydrate had been added, the mixture was heated for an additional two hours (total 10 hours) and then permitted to stand overnight in the cold. The yellow 3,5-dihydrazino-1,2,4-triazine melted at 220–221° with decomposition and formed a red product which did not melt up to 300°.

7 g. of levulinic acid were dissolved in 50 cc. of absolute ethanol and 4.2 g. of 3,5-dihydrazino-1,2,4-triazine were added. The mixture was heated at reflux on a water bath. After several minutes, everything went into solution and the liquid became more and more red in color. Several minutes later, a precipitate began to form. The heating was discontinued after about one hour. The mixture was then cooled and the precipitate which had formed was centrifuged. The precipitate was gummy at first but then became friable after being exposed to the air for two days. Several hours after centrifuging, the mother liquor yielded an additional portion of precipitate which was similarly treated. The dilevulinic acid dihydrazone monohydrate of 3,5-dihydrazino-1,2,4-triazine-[4,4'-(as-triazine - 3,5 - diyldihydrazono)-divaleric acid monohydrate] thus obtained melted at 181°.

*Example 2*

0.5 mol. of pyruvic acid was added to a solution of 0.5 mol. of thiosemicarbazide in 500 ml. of water prepared at 60–70°. The mixture was permitted to stand overnight in the refrigerator. The thiosemicarbazone was centrifuged and dissolved in 1500 ml. of 1 N sodium hydroxide. After heating at reflux for 1 hour, the solution was filtered cold and acidified in the cold with concentrated HCl. After standing overnight in the refrigerator, the product, 5-hydroxy-3-mercapto-6-methyl-1,2,4-triazine, was centrifuged and dried, M.P. 210–212°.

5-hydroxy-3-mercapto-6-methyl-1,2,4-triazine was treated with phosphorus pentasulfide in pyridine, as described in Example 1 to obtain 3,5-dimercapto-6-methyl-1,2,4-triazine, M.P. 215–217°.

On treating the preceding product with a large excess of hydrazine at the boiling point in alcohol, 3,5-dihydrazino-6-methyl-1,2,4-triazine was obtained, M.P. 218–220° (with dec.).

A mixture containing 1.35 g. of 3,5-dihydrazino-6-methyl-1,2,4-triazine, 2 g. of levulinic acid and 10 cc. of absolute ethanol was heated at reflux for one hour. The solution became dark yellow in color. After cooling, a precipitate crystallized little by little. This precipitate was centrifuged, washed with a little ethanol and then air dried. The product, the dilevulinic acid dihydrazone monohydrate of 3,5-dihydrazino-6-methyl-1,2,4-triazine [4,4'-(6-methyl-as-triazine-3,5-diyldihydrazono)-divaleric acid monohydrate], melted at 188°.

*Example 3*

3.5 g. of pyruvic acid were added to a suspension containing 2.1 g. of 3,5-dihydrazino-1,2,4-triazine in 20 cc. of absolute ethanol. A reaction took place immediately with strong evolution of heat. The solution became a very dark red-violet in color. To complete the reaction, the mixture was heated for one hour on a water bath. The precipitate which formed was centrifuged after cooling. The product, the dipyruvic acid dihydrazone monohydrate of 3,5-dihydrazino-1,2,4-triazine [2,2'-(as-triazine-3,5-diyldihydrazono)-dipropionic acid monohydrate], melted at a temperature above 300°. This compound is soluble in aqueous sodium bicarbonate and can be obtained as disodium salt by evaporating off the water.

*Example 4*

27 g. of sodium methylate were suspended in 250 ml. of anhydrous ether. A mixture of 51 g. of ethyl propionate and 73 g. of diethyl oxalate were added dropwise with cooling. The mixture was permitted to stand at room temperature for 12 hours and then the ether and alcohol were distilled off at normal pressure. The solid residue was triturated with 150 ml. of cold, dilute hydrochloric acid until completely dissolved. The oily layer was decanted off. It was then heated at reflux for 3 hours with 280 ml. of water and 140 ml. of concentrated hydrochloric acid. To the still warm solution were added 35 g. of thiosemicarbazide in 350 ml. of water and it was permitted to stand overnight in the refrigerator. The thiosemicarbazone of methylpyruvic acid thus obtained, after crystallization from water, melted at 172–173°.

40 g. of the thiosemicarbazone of methylpyruvic acid were heated at reflux for one hour with 250 ml. of 2 N sodium hydroxide. After acidification with concentrated hydrochloric acid, the 6-ethyl-5-hydroxy-3-mercapto-1,2,4-triazine was crystallized from water, M.P. 166–167°.

5-hydroxy-3-mercapto-6-ethyl-1,2,4-triazine was treated with phosphorus penta-sulfide in pyridine, as described in Example 1, to obtain 3,5-dimercapto-6-ethyl-1,2,4-triazine. On treating the preceding product with a large excess of hydrazine at the boiling point in alcohol, 3,5-dihydrazino-6-ethyl-1,2,4-triazine was obtained, M.P. 165°.

16.9 g. of 3,5-dihydrazino-6-ethyl-1,2,4-triazine and 23.2 g. levulinic acid were dissolved in 100 cc. of absolute ethanol and refluxed for one hour. The mixture was allowed to stand for two days in the refrigerator and the crystalline precipitate which had formed was centrifuged off, washed with a small amount of ethanol and ether. The dilevulinic acid dihydrazone monohydrate of 3,5-dihydrazino-6-ethyl-1,2,4-triazine thus obtained melted at 116° C. Yellow crystals.

*Example 5*

14.1 g. of 3,5-dihydrazino-1,2,4-triazine and 35.6 g. of β-benzoyl-propionic acid were dissolved in 100 cc. of hot absolute ethanol, whereby a precipitate immediately formed. The mixture was heated for 30 minutes and then centrifuged after cooling. The di-(β-benzoyl)-propionic acid dihydrazone monohydrate of 3,5-dihydrazino-1,2,4-triazine thus formed melted at 190–192° (dec.). Yellow crystals.

I claim:
1. A compound of the formula

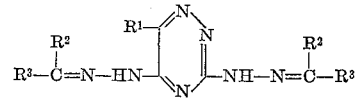

wherein $R^1$ represents a member of the group consisting of hydrogen and lower alkyl, $R^2$ represents a member of the group consisting of hydrogen, lower alkyl and phenyl and $R^3$ represents a member of the group consisting of carboxy lower alkyl and carboxyl.

2. The dilevulinic acid dihydrazone of 3,5-dihydrazino-1,2,4-triazine.

3. The dilevulinic acid dihydrazone of 3,5-dihydrazino-6-methyl-1,2,4-triazine.

4. The dilevulinic acid dihydrazone of 3,5-dihydrazino-6-ethyl-1,2,4-triazine.

5. The dipyruvic acid dihydrazone of 3,5-dihydrazino-1,2,4-triazine.

6. The di-(β-benzoyl)-propionic acid dihydrazone of 3,5-dihydrazino-1,2,4-triazine.

References Cited in the file of this patent

Fusco et al: R. Istituto Lombardi, vol. 91, page 207 (1957).